US008684471B2

(12) United States Patent
Tsai

(10) Patent No.: US 8,684,471 B2
(45) Date of Patent: Apr. 1, 2014

(54) BICYCLE RIM

(75) Inventor: Wen-Feng Tsai, Taichung (TW)

(73) Assignee: Tien Hsin Industries Co., Ltd., Taichung (TW)

(*) Notice: Subject to any disclaimer, the term of this patent is extended or adjusted under 35 U.S.C. 154(b) by 548 days.

(21) Appl. No.: 13/017,139

(22) Filed: Jan. 31, 2011

(65) Prior Publication Data

US 2012/0193970 A1    Aug. 2, 2012

(51) Int. Cl.
*B60B 21/00* (2006.01)
*B60B 5/00* (2006.01)

(52) U.S. Cl.
USPC .................................. 301/95.101; 301/95.102

(58) Field of Classification Search
USPC ............... 301/55, 95.101, 95.102, 95.107, 301/95.108, 64.701, 64.702, 64.703
See application file for complete search history.

(56) References Cited

U.S. PATENT DOCUMENTS

| 1,402,003 | A | * | 1/1922 | Miller ........................ 301/29.2 |
| 5,797,660 | A | * | 8/1998 | Johnson ....................... 301/73 |
| 5,975,645 | A | | 11/1999 | Sargent ........................ 301/95 |

* cited by examiner

*Primary Examiner* — Glenn Dayoan
*Assistant Examiner* — Jason S Daniels
(74) *Attorney, Agent, or Firm* — Alan Kamrath; Kamrath IP Lawfirm, P.A.

(57) ABSTRACT

A bicycle rim includes a body having an axis defining a center thereof. The body includes an outer periphery and an inner periphery. The outer periphery and the axis have an outer radius therebetween, and the outer radius is constant. The inner periphery includes a first portion having a non-constant diameter.

6 Claims, 6 Drawing Sheets

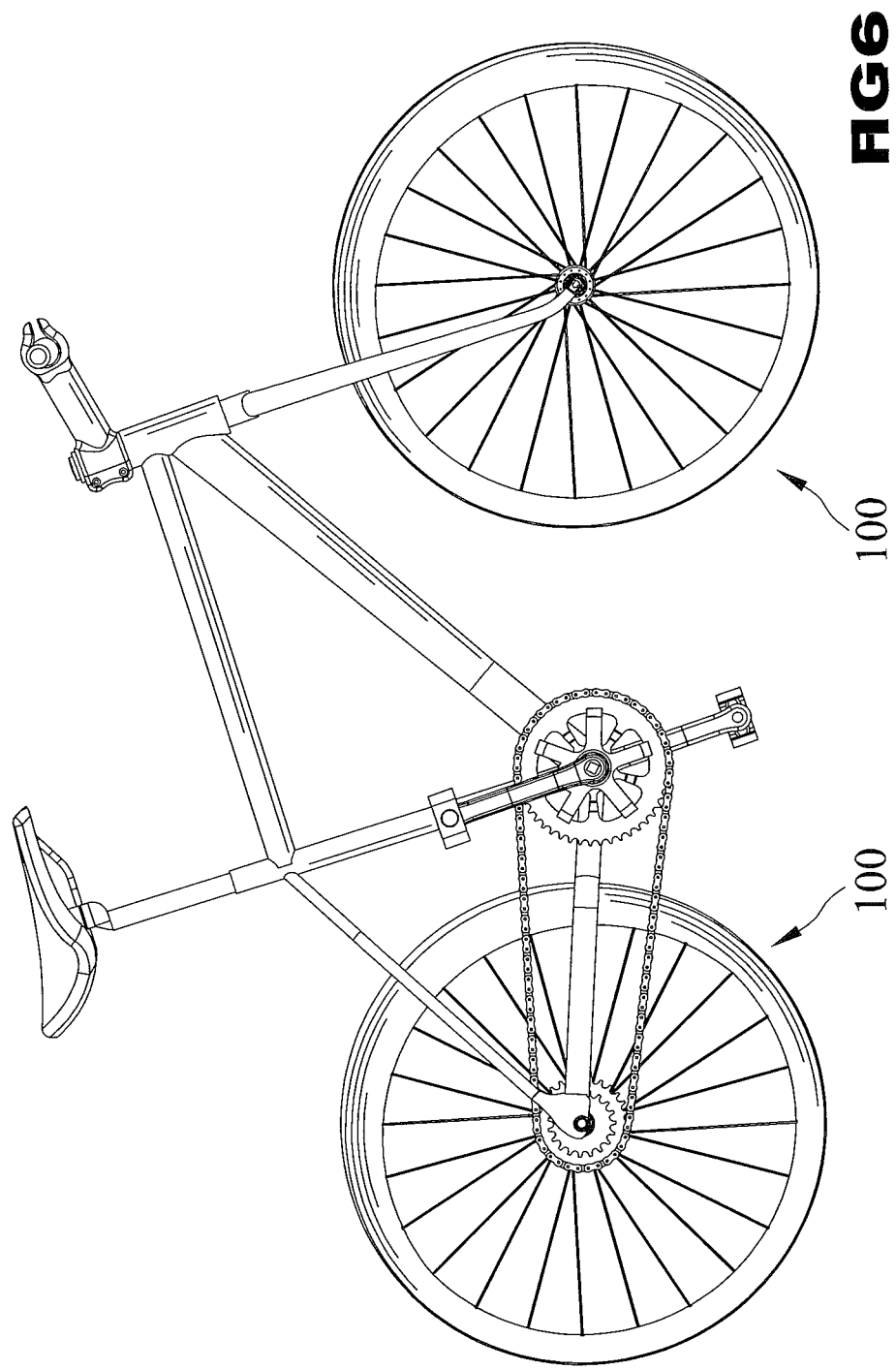

BICYCLE RIM

BACKGROUND OF THE INVENTION

1. Field of the Invention

The present invention relates generally to a bicycle rim and, more particularly, to a bicycle rim having an inner periphery which has a non-constant diameter.

2. Description of the Related Art

Bicycling is becoming an increasingly more popular form of recreation as well as a means of transportation. One component of the bicycle that has been extensively redesigned is the bicycle wheel. Bicycle wheels are constantly being redesigned to be strong, lightweight and more aerodynamic in design as well as to be simple to manufacture and assemble.

U.S. Pat. No. 5,975,645 discloses a bicycle wheel which has good impact properties and increased durability. In one embodiment, the rim comprises a two piece rim having a carbon fiber based body portion having bulbous sidewalls capable of flexing in response to radially directed forces, and a tire engaging, hoop-like rim made from aluminum. The rim includes a pair of parallel braking surfaces. In the preferred embodiment, the convex curved sides of the wheel, in transverse cross section, are wider than the braking surfaces and intersect the braking surfaces at an angle of less than about 175 degrees.

In this known structure, the rim has a constant inner diameter and outer diameter so that the weight of each part of the rim is constant. The rim can not provide an extra moment of inertia while it is rotating.

The present invention is, therefore, intended to obviate or at least alleviate the problems encountered in the prior art.

SUMMARY OF THE INVENTION

According to the present invention, the main purpose is to provide a bicycle rim which comprises a body having an axis defining a center thereof. The body includes an outer periphery and an inner periphery. The outer periphery and the axis have an outer radius therebetween, and the outer radius is constant. The inner periphery includes a first portion having a non-constant diameter.

An advantage of the bicycle rim according to the present invention is that the bicycle rim would provide an extra torque to facilitate a rider to start off riding a bicycle due to the weight of the first portion being larger than that of the second portion.

Another advantage of the bicycle rim according to the present invention is that the first portion would provide an extra moment of inertia, and the rider will feed the extra moment of inertia via a frame of the bicycle.

Other advantages and features of the present invention will become apparent from the following description referring to the drawings.

BRIEF DESCRIPTION OF THE DRAWINGS

FIG. 6 shows the bicycle rim is adapted to be installed to a bicycle.

DETAILED DESCRIPTION OF THE PREFERRED EMBODIMENTS

Figure 1:
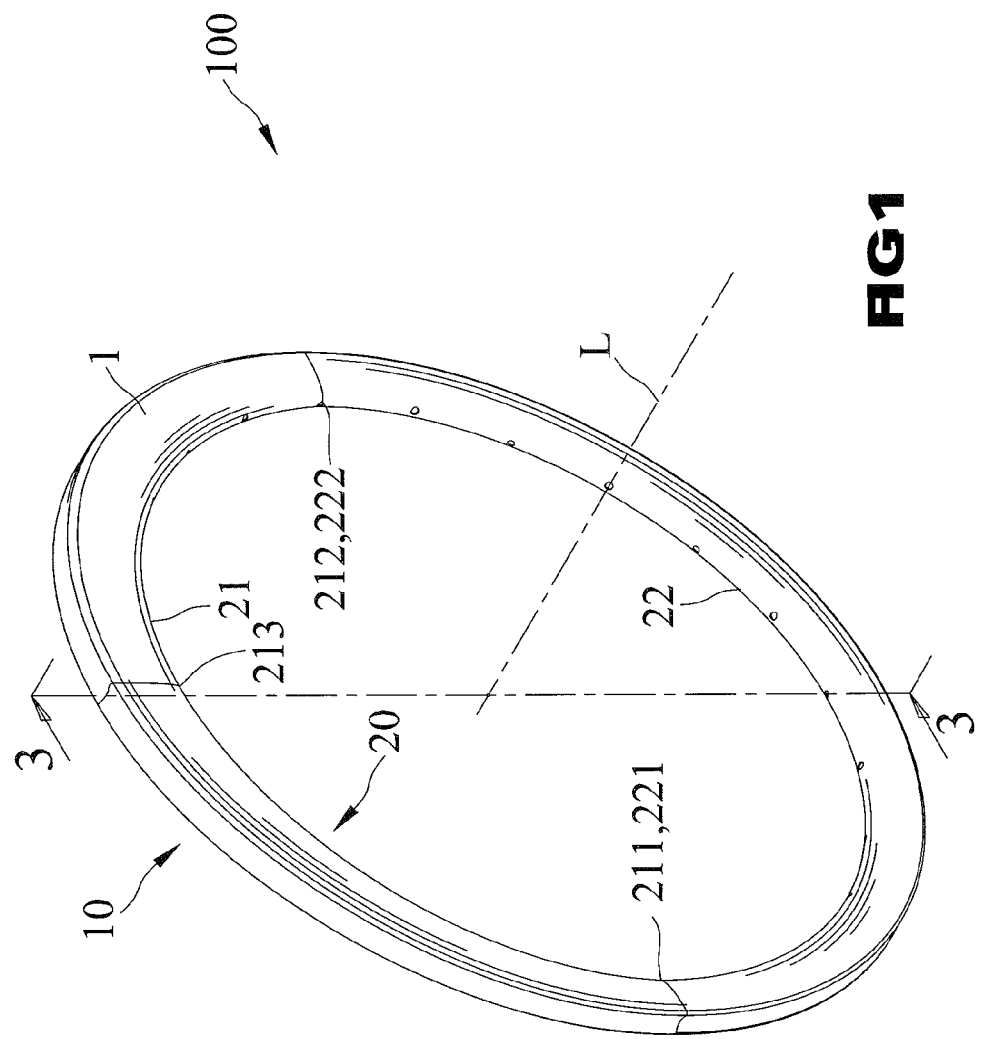
FIG. 1 is a perspective view of a bicycle rim according to a first embodiment of the present invention.
Figure 2:
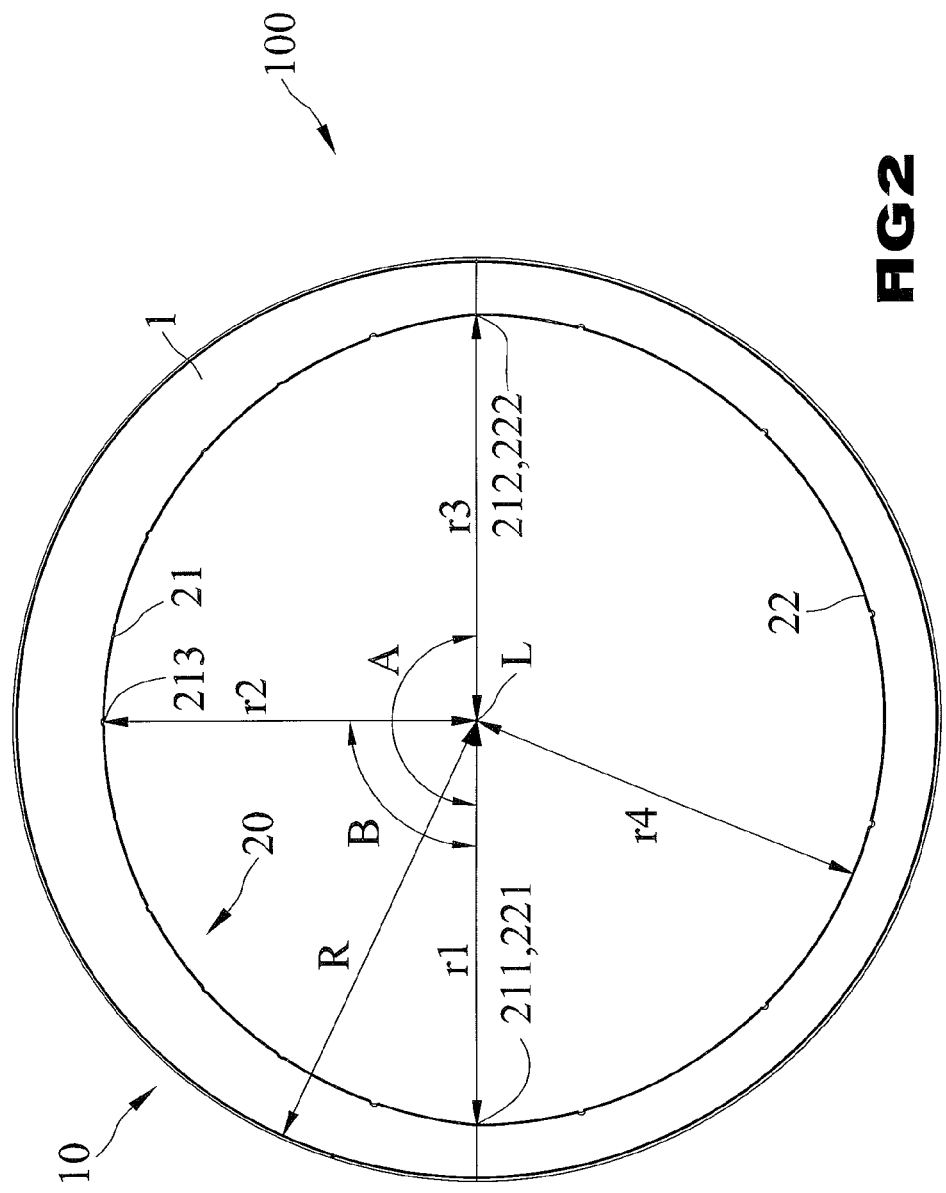
FIG. 2 is a side view of a bicycle rim according to the first embodiment of the present invention.
Figure 3:
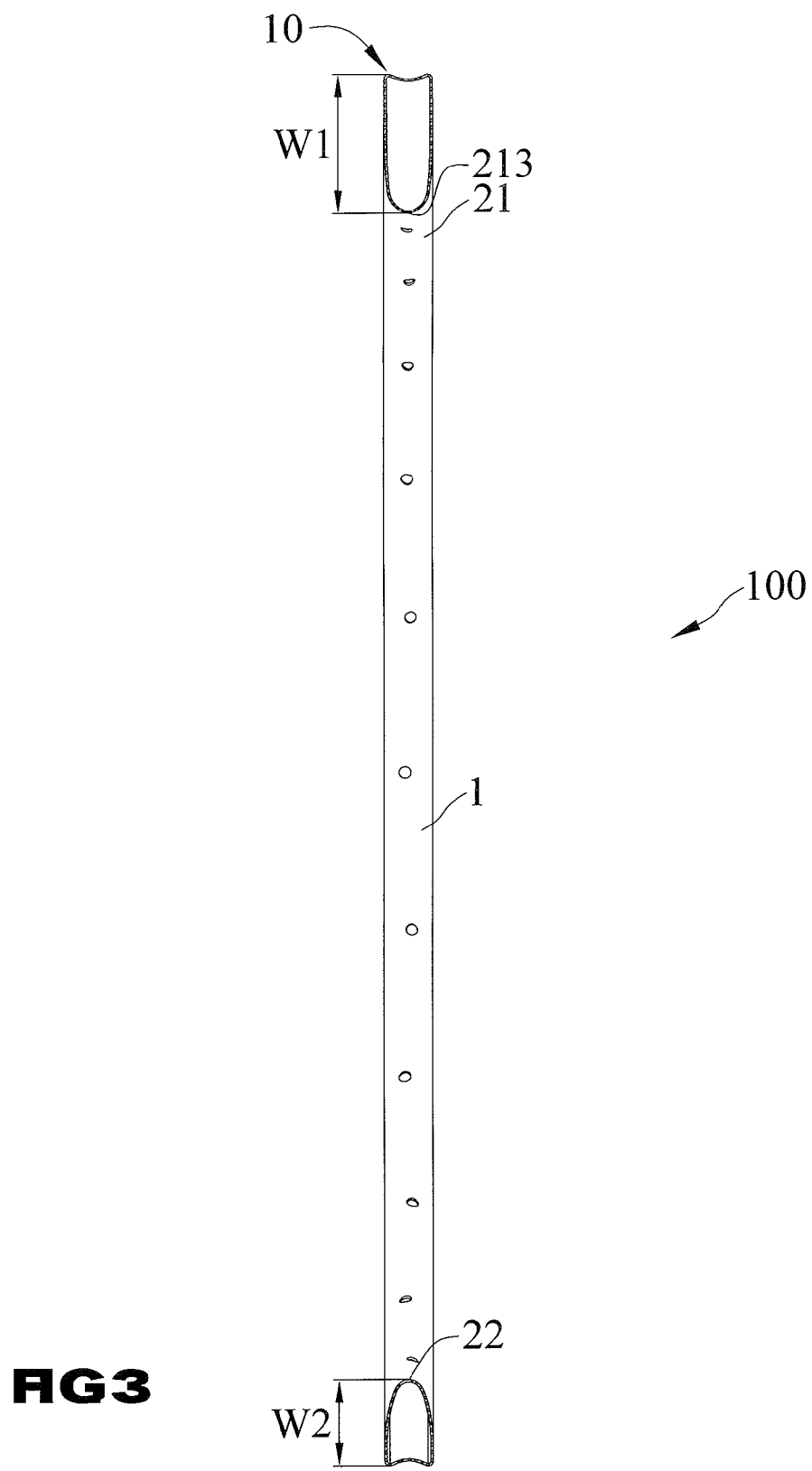
FIG. 3 is a cross-sectional view taken along line 3-3 in FIG. 1.
Figure 4:
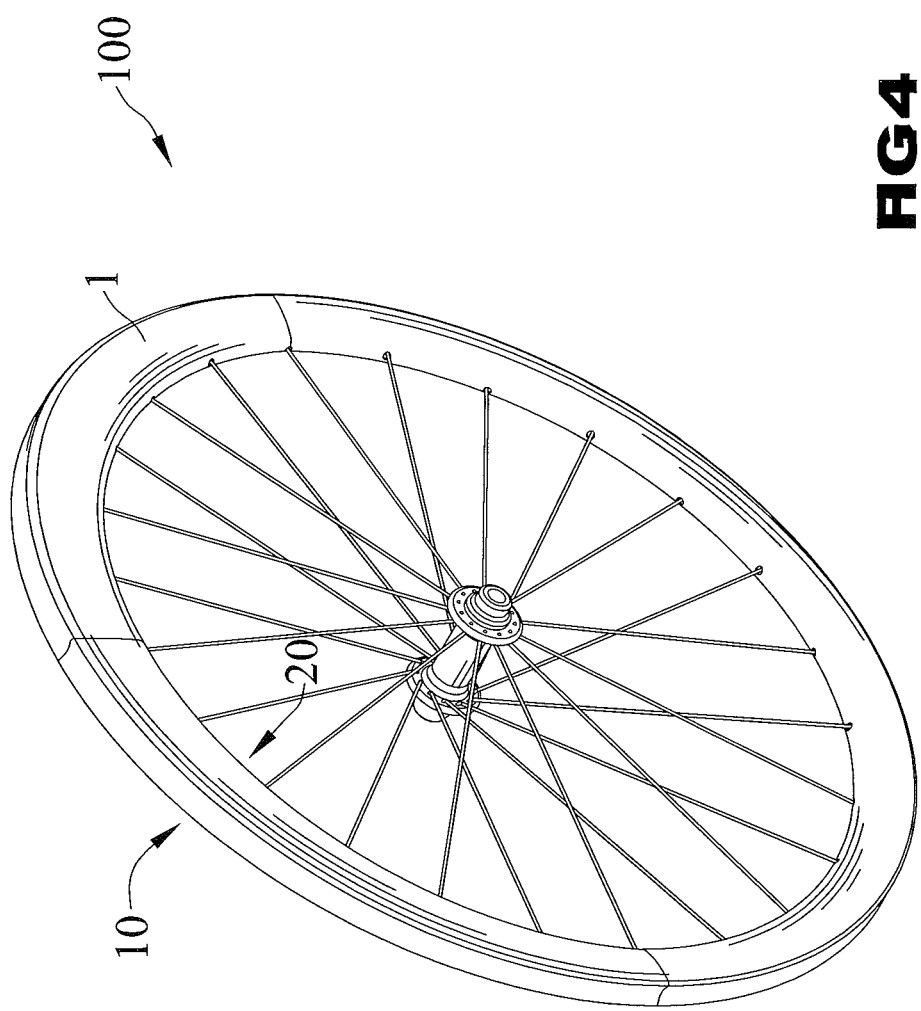
FIG. 4 illustrates the bicycle rim is assembled with spokes and a hub.
Figure 5:
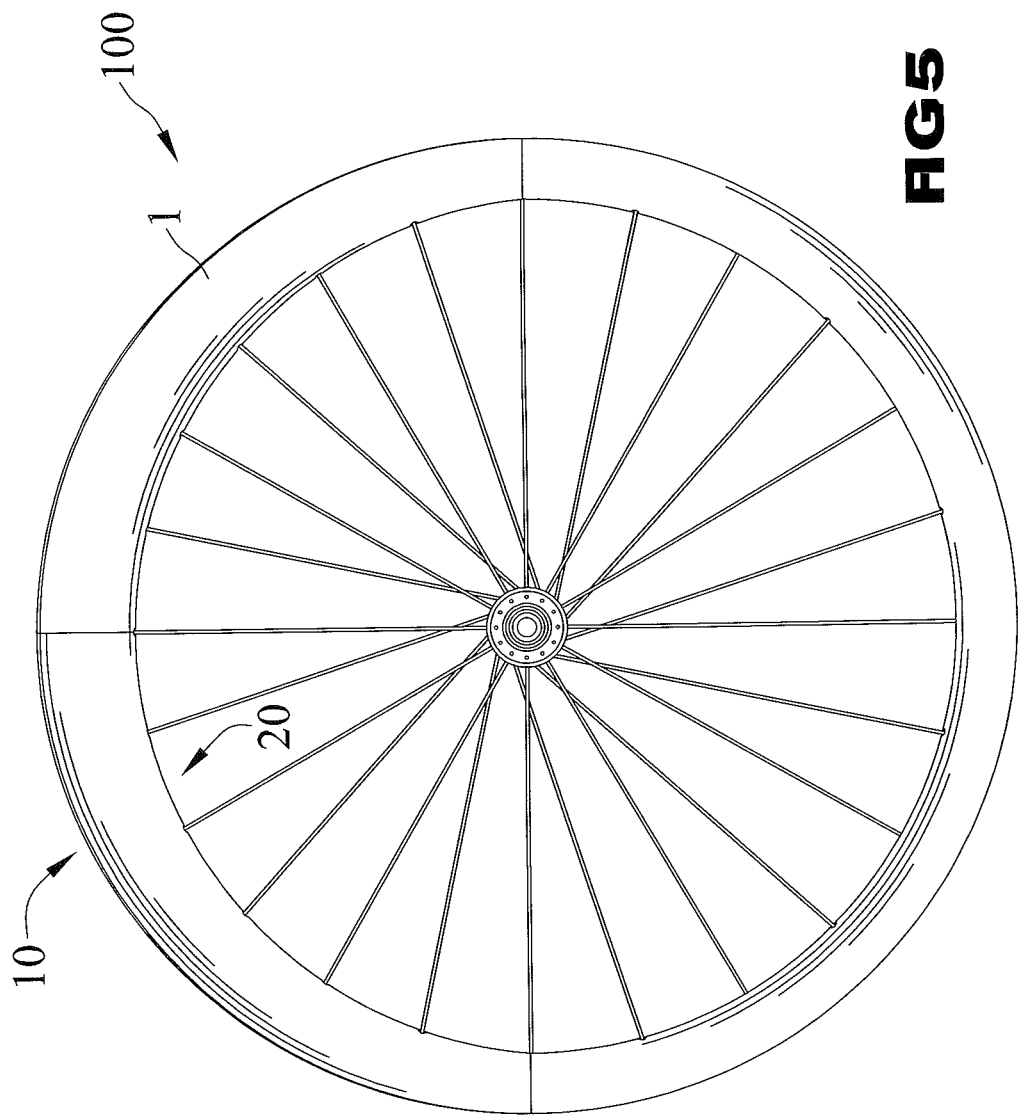
FIG. 5 illustrates the bicycle rim is assembled with spokes and a hub taken from another angle.

Referring to FIGS. 1 through 6, there is shown a bicycle rim 100 according to the present invention. The bicycle rim 100 is constructed of a carbon fiber composite and comprises a body 1. The body 1 has an axis L defining a center thereof and includes an outer periphery 10 and an inner periphery 20. The outer periphery 10 and the axis L have an outer radius R therebetween. Particularly, the outer radius R is constant. The inner periphery 20 has a non-constant diameter and includes a first portion 21 and a second portion 22. The first portion 21 has a first end 211 and a second end 212. The second portion 22 has a first end 221 connected to the first end 211 of the first portion 21, and a second end 222 connected to the second end 212 of the first portion 21.

The first portion 21 further has a wider section 213 between the first end 211 and the second end 212 thereof. The first end 211 of the first portion 21 and the center of the body 1 have a first radius r1 therebetween, and the first radius r1 is also a radius between the first end 221 of the second portion 22 and the center of the body 1. The wider section 213 of the first portion 21 and the center of the body 1 have a second radius r2 therebetween. The second end 212 of the first portion 21 and the center of the body 1 have a third radius r3 therebetween, and the third radius r3 is also a radius between the second end 222 of the second portion 22. Preferably, the first radius r1 is larger than the second radius r2, and a radius between the first portion 21 and the center of the body 1 continuously decreases from the first end 211 to the wider section 213. The third radius r3 is larger than the second radius r2, and the radius between the first portion 21 and the center of the body 1 continuously decreases from the second end 212 to the wider section 213. The first portion 21 is substantially a curve to prevent stress concentration. Preferably, the first radius r1 is equal to the third radius r3. The second portion 22 and the center of the body 1 have a fourth radius r4 therebetween. The fourth radius r4 is constant and is equal to the first radius r1 and the third radius r3, so that each angle between the first end 211 of the first portion 21 and the first end 221 of the second portion 22, and between the second end 212 of the first portion 21 and the second end 222 of the second portion 22, is not acute. Thus, stress concentration is prevented. Each radius R, r1, r2, r3, and r4 defined above is limited to the contour of the bicycle rim 100, and does not include the increase/decrease dimensions of a hole for installing a spoke or a reinforcement element for enhancing the strength of the hole.

The first portion 21 has a first angle A and a second angle B. The first angle A is distributed around the axis L and is delimited by the first end 211 and the second end 212. The first angle A is larger than ninety degrees and is less than three hundreds degrees. In a preferred form, the first angle A is one hundred and eighty degrees. The second angle B is distributed around the axis L and is delimited by the first end 211 and the wider section 213. The second angle B is larger than 25% of the first angle A and is less than 75% of the first angle A. In the preferred form, the second angle B is equal to half of the first angle A.

The outer periphery 10 and the wider section 213 of the first portion 21 have a first width W1 therebetween, and the first width W1 is a difference between the outer radius R and the second radius r2. The first width W1 has a maximum value, while the second radius r2 is zero. In the meanwhile, the first width W1 is equal to the outer radius R. The outer periphery 10 and the second portion 21 have a second width W2 therebetween, and the second width W2 is a difference between the outer radius R and the fourth radius r4. Preferably, the first width W1 is larger than 125% of the second width W2 and is less than the outer radius R. A width between the outer periphery 10 and the first portion 21 continuously increases from the first end 211 to the wider section 213 due to the radius between the first portion 21 and the center of the body 1 continuously decreasing from the first end 211 to the wider section 213. The width between the outer periphery 10 and the first portion 21 continuously increases from the second end 212 to the wider section 213 due to the radius between the first portion 21 and the center of the body 1 continuously decreasing from the second end 212 to the wider section 213. Therefore, the first portion 21 has a surface area larger than that of the second portion 22 and has a weight larger than that of the second portion 22.

The bicycle rim 100 is adapted to be assembled with spokes and a hub to be installed to a bicycle. The bicycle rim 100 would provide an extra torque to facilitate a rider to start off riding the bicycle due to the weight of the first portion 21 being larger than that of the second portion 22. Additionally, the first portion 21 would provide an extra moment of inertia, and the rider will feed the extra moment of inertia via a frame of the bicycle.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A bicycle rim comprising:
   a body having an axis defining a center thereof, with the body including an outer periphery and an inner periphery;
   wherein the outer periphery and the axis have an outer radius therebetween, with the outer radius being constant;
   wherein the inner periphery includes a first portion, with the first portion having a non-constant diameter;
   wherein the first portion has a first end, a second end and a wider section between the first end and the second end;
   wherein the first end of the first portion and the center of the body have a first radius therebetween;
   wherein the wider section of the first portion and the center of the body have a second radius therebetween;
   wherein the first radius is larger than the second radius;
   wherein a radius between the first portion and the center of the body continuously decreases from the first end to the wider section; and
   wherein the first portion has a first angle which is distributed around the axis and is delimited by the first end and the second end, with the first angle larger than ninety degrees.

2. The bicycle rim as claimed in claim 1, wherein the second end of the first portion and the center of the body have a third radius therebetween, wherein the third radius is larger than the second radius, and wherein the radius between the first portion and the center of the body continuously decreases from the second end to the wider section.

3. The bicycle rim as claimed in claim 1, wherein the inner periphery includes a second portion, wherein the second portion and the center of the body have a fourth radius therebetween, and wherein the fourth radius is constant and is equal to the first radius.

4. The bicycle rim as claimed in claim 1, wherein the first portion has a second angle distributed around the axis and is delimited by the first end and the wider section, and wherein the second angle is larger than 25% of the first angle and is less than 75% of the first angle.

5. The bicycle rim as claimed in claim 1, wherein the outer periphery and the wider section of the first portion have a first width therebetween, wherein the outer periphery and the second portion have a second width therebetween, wherein the first width is larger than 125% of the second width and is less than the outer radius.

6. The bicycle rim as claimed in claim 1, wherein the body is constructed of carbon fiber composite.

* * * * *